United States Patent
Cho et al.

(10) Patent No.: US 10,602,120 B2
(45) Date of Patent: Mar. 24, 2020

(54) METHOD AND APPARATUS FOR TRANSMITTING IMAGE DATA, AND METHOD AND APPARATUS FOR GENERATING 3D IMAGE

(71) Applicant: Samsung Electronics Co., Ltd., Suwon-si, Gyeonggi-do (KR)

(72) Inventors: Yang Ho Cho, Seongnam-si (KR); Dong Kyung Nam, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 313 days.

(21) Appl. No.: 15/210,266

(22) Filed: Jul. 14, 2016

(65) Prior Publication Data

US 2017/0180700 A1 Jun. 22, 2017

(30) Foreign Application Priority Data

Dec. 21, 2015 (KR) ........................ 10-2015-0182748

(51) Int. Cl.
| | |
|---|---|
| *H04N 13/194* | (2018.01) |
| *H04N 13/106* | (2018.01) |
| *H04N 13/161* | (2018.01) |
| *H04N 13/111* | (2018.01) |
| *H04N 13/139* | (2018.01) |
| *H04N 13/156* | (2018.01) |

(52) U.S. Cl.
CPC ......... *H04N 13/194* (2018.05); *H04N 13/106* (2018.05); *H04N 13/111* (2018.05); *H04N 13/139* (2018.05); *H04N 13/156* (2018.05); *H04N 13/161* (2018.05)

(58) Field of Classification Search
CPC .. H04N 13/194; H04N 13/106; H04N 13/156; H04N 13/139; H04N 13/161; H04N 13/111
USPC .......................................................... 348/43
See application file for complete search history.

(56) References Cited

U.S. PATENT DOCUMENTS

| | | | | |
|---|---|---|---|---|
| 2010/0118127 A1* | 5/2010 | Nam | ..................... | H04N 13/122 348/51 |
| 2012/0242790 A1* | 9/2012 | Sandrew | .............. | H04N 13/257 348/43 |

(Continued)

FOREIGN PATENT DOCUMENTS

| | | |
|---|---|---|
| JP | 4355914 B2 | 11/2009 |
| JP | 5683756 B1 | 3/2015 |

(Continued)

*Primary Examiner* — Jefferey F Harold
*Assistant Examiner* — Omer Khalid
(74) *Attorney, Agent, or Firm* — Harness, Dickey & Pierce, P.L.C.

(57) ABSTRACT

Transmitting image data, and generating a three-dimensional (3D) image, may include generating one or more images associated with corresponding fields of view of one or more viewpoints that a display is configured to provide to a user, generating image data based on the images, and transmitting the image data to a target device. The one or more images may be generated based on weaving one or more images to generate one or more panel images. An image device that may receive the image data may generate one or more first images based on the image data, select one or more second images from the first images, and generate a panel image based on weaving the selected second images.

10 Claims, 10 Drawing Sheets

(56) References Cited

U.S. PATENT DOCUMENTS

2013/0073293 A1  3/2013  Jang et al.
2014/0184743 A1* 7/2014  Chen .................... H04N 13/194
                                                348/43

FOREIGN PATENT DOCUMENTS

| KR | 10-0874226 B1 | 12/2008 |
|----|---------------|---------|
| KR | 10-1249901 B1 | 4/2013  |
| KR | 10-2014-0108435 | 9/2014 |

* cited by examiner

METHOD AND APPARATUS FOR TRANSMITTING IMAGE DATA, AND METHOD AND APPARATUS FOR GENERATING 3D IMAGE

CROSS-REFERENCE TO RELATED APPLICATION

This application claims the priority benefit of Korean Patent Application No. 10-2015-0182748, filed on Dec. 21, 2015, in the Korean Intellectual Property Office, the disclosure of which is incorporated herein by reference in its entirety.

BACKGROUND

1. Field

At least one example embodiment relates to transmitting image data, particularly to generating panel images, and more particularly to providing three-dimensional (3D) images for a plurality of screens or displays.

2. Description of the Related Art

An N-screen service is a network service that allows users to use ("access", "consume", etc.) the same content using a plurality of devices. For example, a next generation computing network service may allow users to share a single item ("instance") of content using various devices including smartphones, personal computers (PCs), smart televisions (TVs), and tablet PCs.

The N-screen service may provide content with a desired (and/or alternatively predetermined) size and a desired (and/or alternatively predetermined) resolution through one or more devices, irrespective of types of the devices. For example, the N-screen service may provide a common image with the same resolution through each of a small display of a cellular phone and a large display of an Internet Protocol television (IPTV).

SUMMARY

Some example embodiments relate to transmitting image data.

According to some example embodiments, a method of transmitting image data may include generating a panel image based on weaving a plurality of images according to an image expression pattern of a display, generating one or more view images based on the panel image, converting the one or more view images into one or more instances of image data, and transmitting the image data to a target device.

The method may include generating one or more virtual view images based on one or more input images, and the method may further include weaving the one or more input images and the one or more virtual view images to generate the panel image.

The generating of the one or more virtual view images may include calibrating the one or more input images, determining one or more depth values of the input images based on the calibrated one or more input images, and generating the one or more virtual view images based on the one or more depth values.

The one or more input images may include a plurality of input images; and the calibrating includes calibrating at least one of a geometric structure in the input images, and a photometric difference between the input images.

The generating of the panel image may include separately sampling the one or more input images and the one or more virtual view images to generate the panel image.

The generating of the panel image may include separately sampling the one or more input images and the one or more virtual view images based on the image expression pattern to generate the panel image.

The converting may include compressing the one or more view images to generate the one or more instances of image data.

According to some example embodiments, an apparatus for transmitting image data may include a memory having computer-readable instructions stored therein, and a processor configured to execute the computer-readable instructions to generate a panel image based on weaving a plurality of images according to an image expression pattern of a display, generate one or more view images based on the panel image, and convert the one or more view images into one or more instances of image data. The apparatus may include a communicator configured to transmit the one or more instances of image data to a target device.

The processor may be configured to execute the computer-readable instructions to generate one or more virtual view images based on one or more input images, and generate the panel image based on weaving the one or more input images and the one or more virtual view images.

According to some example embodiments, a method of generating an image may include receiving one or more instances of image data from an external device, generating one or more first images based on processing the image data, selecting one or more of the first images as one or more second images based on determining that the one or more second images correspond to one or more corresponding fields of view of one or more viewpoints that a display is configured to provide to a user, and generating a panel image based on weaving the one or more second images.

The generating the panel image may include weaving the one or more second images based on an image expression pattern of the display to generate the panel image.

The determining that the one or more second images correspond to one or more corresponding fields of view of one or more viewpoints that a display is configured to provide to a user may be based on a range of depth values that the display is configured to express.

The method may include enhancing a resolution of one or more of the second images, wherein the generating the panel image includes generating the panel image based on the resolution-enhanced second images.

The enhancing a resolution of one or more of the second images includes enhancing the resolution of the one or more second images based on at least one of the first images.

The generating one or more first images may include decoding the one or more instances of image data to generate the one or more first images, the one or more instances of image data being compressed.

According to some example embodiments, an apparatus for generating an image may include a communicator configured to receive one or more instances of image data from an external device, a memory having computer-readable instructions stored therein, and a processor configured to execute the computer-readable instructions to generate one or more first images based on processing the image data, select one or more of the first images as one or more second images based on determining that the one or more second images correspond to one or more corresponding fields of view of one or more viewpoints that a display is configured to provide to a user, and generate a panel image based on weaving the one or more second images.

The processor may be configured to execute the computer-readable instructions to determine that the one or more second images correspond to one or more corresponding fields of view of one or more viewpoints that a display is configured to provide to a user, based on a range of depth values that the display is configured to express.

According to some example embodiments, a method of transmitting image data may include generating one or more view images based on separately sampling one or more input images, converting the one or more view images into one or more instances of image data; and transmitting the one or more instances of image data to a target device.

The generating one or more view images may include generating one or more virtual view images based on the one or more input images, and generating the one or more view images based on the one or more input images and the one or more virtual view images.

Additional aspects of example embodiments will be set forth in part in the description which follows and, in part, will be apparent from the description, or may be learned by practice of the disclosure.

BRIEF DESCRIPTION OF THE DRAWINGS

The foregoing and other features of inventive concepts will be apparent from the more particular description of non-limiting embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an etched region or an implanted region illustrated as a rectangle may have rounded or curved features. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 1:
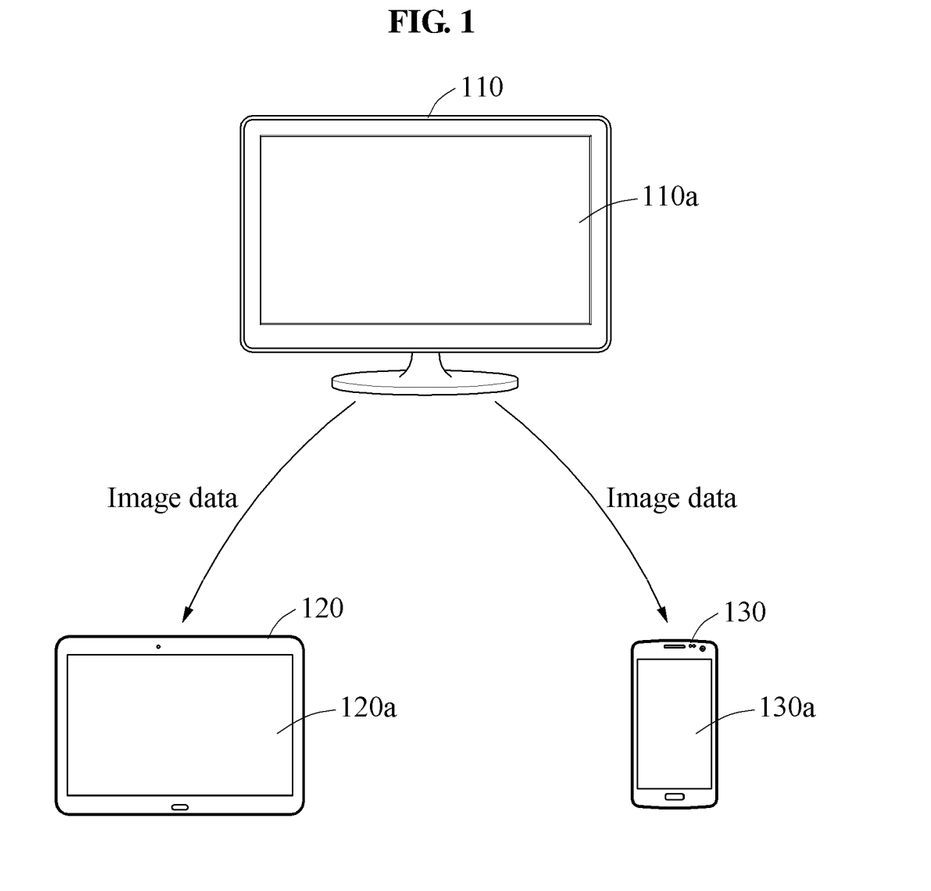
FIG. 1 illustrates a three-dimensional (3D) image system using a plurality of screens according to at least one example embodiment.

FIG. 1 illustrates a three-dimensional (3D) image system using a plurality of screens according to at least one example embodiment.

Referring to FIG. 1, the 3D image system includes a main device 110, and one or more sub-devices 120 and 130. The 3D image system may provide a 3D image to a user using a plurality of screens. Each of the main device 110 and the sub-devices 120 and 130 may include a respective display interface 110a, 120a, 130a. Each of the main device 110 and the sub-devices 120 and 130 may provide, through a respective display interface 110a, 120a, 130a, a 3D image corresponding to the same image to the user based on a performance of the corresponding device. The provided 3D image may be an autostereoscopic multiview image or a light field image. Each device may include an apparatus for providing a 3D image. The multiview image may provide view images to positions corresponding to a plurality of viewpoints. The light field image may provide an image with respect to a relatively wide area, when compared to the multiview image. For example, each device may include a display interface 110a, 120a, 130a including at least one of a lenticular lens and a barrier, and a directional backlight.

To provide an autostereoscopic 3D image, each device may generate a panel image by weaving a plurality of two-dimensional (2D) images. Each device may weave the 2D images based on an image expression pattern of the display. For example, in a case of providing the multiview image, the image expression pattern may be a method of expressing each viewpoint and a number of viewpoints providable using the device. A viewpoint that is "providable" to a user through a display and/or using a device may refer to a viewpoint that is associated with a display configuration of the display and/or a display interface of the device, an image expression pattern associated with the display and/or a display interface of the device, some combination thereof, or the like. For example, the display and/or display interface may be configured to display an image corresponding to a field of view associated with the viewpoint, thereby rendering the viewpoint "providable" to a user through the display and/or display interface. A display and/or display interface may be configured to display a panel image of a scene and convert the displayed panel image into one or more light fields corresponding to one or more images associated with the one or more "providable" viewpoints. In a case of providing the light field image, the image expression pattern may be a method of adjusting the lens or the barrier to provide a 3D image.

The plurality of 2D images may include at least one of an actual image acquired by a camera and a virtual view image. A virtual viewpoint may differ from a viewpoint of the actual image, and the virtual view image may be generated based on the actual image. A high computational complexity may be included in generating the virtual view image. When an apparatus for processing a virtual view image is a mobile device, the virtual view image may not be generated in real time.

The 3D image system may employ a method of generating a virtual view image using the main device 110 with excellent data processing performance, and generating a 3D image based on the generated virtual view image using the sub-device 120. A method of providing a 3D image will be described in detail with reference to FIGS. 2 through 10.

Figure 2:
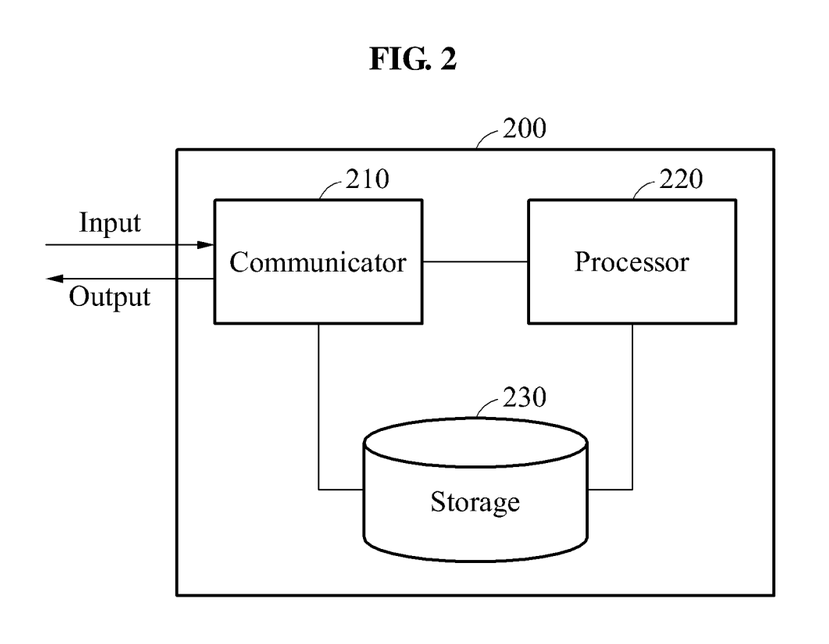
FIG. 2 illustrates an apparatus for transmitting image data according to at least one example embodiment.

FIG. 2 illustrates an apparatus for transmitting image data according to at least one example embodiment.

The main device 110 of FIG. 1 may include an apparatus 200 for transmitting image data. The apparatus 200 for transmitting image data may transmit image data to be used to provide a 3D image to the sub-device 120 of FIG. 1. In some example embodiments, the apparatus 200 may be included in one or more of the devices 120, 130 of FIG. 1. An apparatus 200 included in one or more of the devices 120, 130 may be an apparatus 200 for receiving image data.

The apparatus 200 for transmitting image data includes a communicator 210, a processor 220, and a storage 230. The storage 230 may be referred to interchangeably herein as a memory 230.

The communicator 210 may be connected to an external device, and transmit and receive data to and from the external device. For example, the communicator 210 may transmit image data to the sub-device 120.

The processor 220 may process the data received by the communicator 210 and data stored in the storage 230. The processor may be a central processing unit (CPU), a controller, or an application-specific integrated circuit (ASIC), that when, executing instructions stored in the memory 230, configures the processor as a special purpose computer to perform one or more of the operations described herein.

The storage 230 ("memory 230") may store the data received by the communicator 210 and the data processed by the processor 220. The memory 230 may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM). The memory 230 may store computer-readable instructions. The memory 230 may include a non-transitory computer-readable storage medium. The processor 220 may execute one or more computer-readable instructions stored in the memory 230 to perform one or more operations.

The communicator 210, the processor 220, and the storage 230 will be described in detail with reference to FIGS. 3 through 7.

Figure 3:
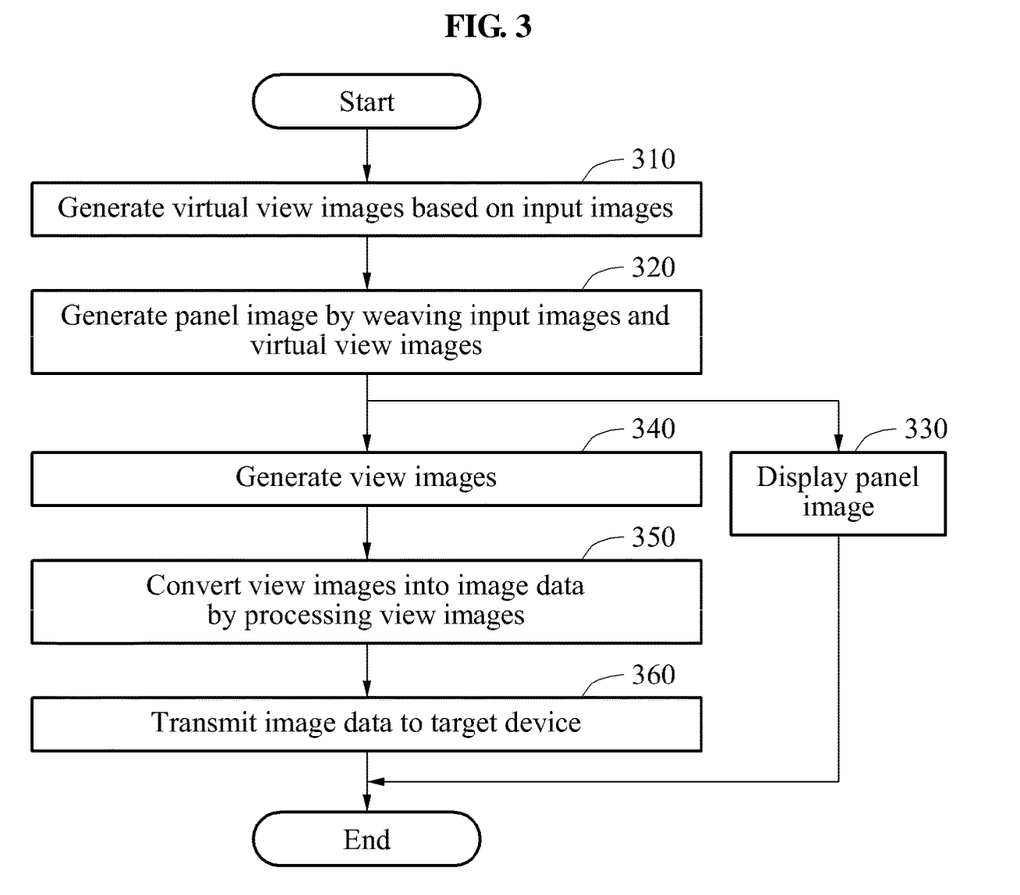
FIG. 3 illustrates a method of transmitting image data according to at least one example embodiment.

FIG. 3 illustrates a method of transmitting image data according to at least one example embodiment.

One or more portions of an apparatus 200, including the processor 220, of FIG. 2 may perform operations 310 through 360 to generate a 3D image. In some example embodiments, an apparatus 200 performing one or more of operations 310 to 360 may be included in device 110. A processor 220 may perform one or more operations described herein based on executing one or more computer-readable instructions stored on the memory 230.

Referring to FIG. 3, at operation 310, the apparatus 200 may generate one or more virtual view images based on one or more input images. A virtual viewpoint will be described in detail with reference to FIG. 5. For example, the input images may include an image acquired using a camera, and a virtual view image generated by another device. The input images may be received from an external device. If and/or when a virtual view image is included in a received input image, the virtual view images generated in operation 310 may be additional virtual view images.

For example, the virtual view images may be generated by warping pixels of the input images. The generated virtual view images may include holes, and the holes may be restored.

A method of generating a virtual view image will be described in detail with reference to FIG. 4.

In operation 320, the apparatus 200 may generate a panel image based on weaving the input images and the virtual view images. The panel image may be a 3D image. For example, the panel image may be generated by separately sampling the input images and the virtual view images. The panel image may be generated by separately sampling the input images and the virtual view images based on an input expression pattern of a display. The penal image may be a multiview image or a light field image depending on a displaying scheme.

A panel image will be described in detail with reference to FIG. 6.

In operation 330, the apparatus 200 may display the panel image through the display.

The apparatus 200 may perform operations 340 and 350 to generate image data to be transmitted to the sub-device 120.

In operation 340, the apparatus 200 may generate view images. The view images may be images acquired from desired (and/or alternatively predetermined) viewpoints.

In an example, the view images may be generated based on the panel image. The generated view images may correspond to the input images and the virtual view images, respectively. For example, resolutions of the view images may be lower than resolutions of the input images and the virtual view images.

In another example, the view images may be generated by sampling the input images and the virtual view images generated in operation 310. If and/or when the view images are generated based on the images generated in operation 310, operations 320 and 330 may not be performed.

View images will be described in detail with reference to FIG. 7.

In operation 350, the apparatus 200 may convert the view images into image data by processing the view images. For example, the view images may be separately processed to be compressed. In another example, the view images may be merged into a single image, and the merged image may be compressed.

In operation 360, the apparatus 200 may transmit the image data to one or more target devices. The target devices may be the sub-devices 120 and 130 of FIG. 1. For example, the image data may be transmitted using wired or wireless communication. The wireless communication may be near field communication. Operation 360 may be performed by the communicator 210.

Figure 4:
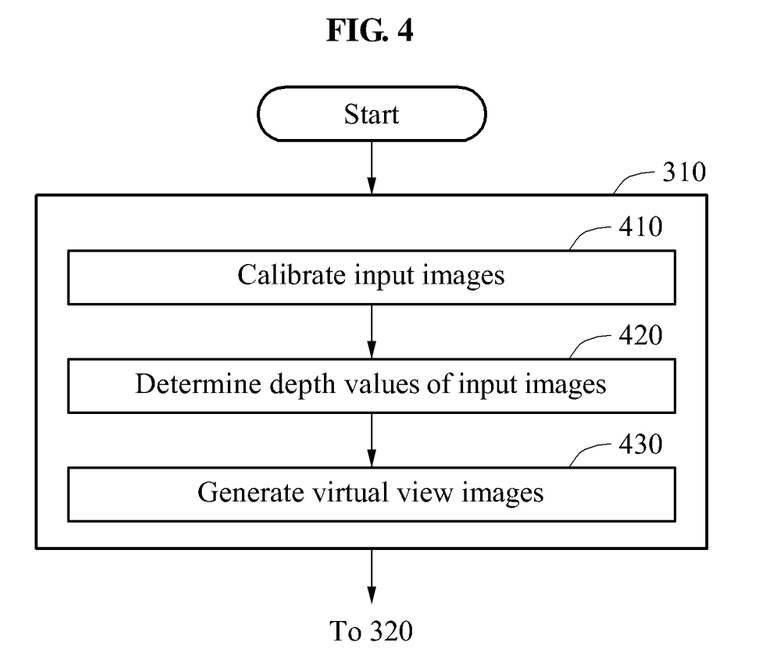
FIG. 4 illustrates a method of generating virtual view images according to at least one example embodiment.

FIG. 4 illustrates a method of generating virtual view images according to at least one example embodiment.

Operation 310 of FIG. 3 may include operations 410 through 430. One or more portions of an apparatus 200, including the processor 220, of FIG. 2 may perform operations 410 to 430. In some example embodiments, an apparatus 200 performing one or more of operations 410 to 430 may be included in device 110. A processor 220 may perform one or more operations described herein based on executing one or more computer-readable instructions stored on the memory 230.

In operation 410, the apparatus 200 of FIG. 2 may calibrate one or more input images. For example, the input images may be stereoscopic images. At least one of a geometric structure in the input images and a photometric difference between the input images may be calibrated.

In operation 420, the apparatus 200 may determine depth values of the input images based on the calibrated input images. For example, a depth map representing the depth values of the input images may be generated.

In operation 430, the apparatus 200 may generate one or more virtual view images based on the depth values of the input images. For example, the virtual view images may be generated by warping pixels of the input images. An initial virtual view image to be generated may include a hole, and the virtual view image may be generated by restoring the hole. The hole of the virtual view image may be restored based on at least one of the input images and another virtual view image being generated.

Figure 5:
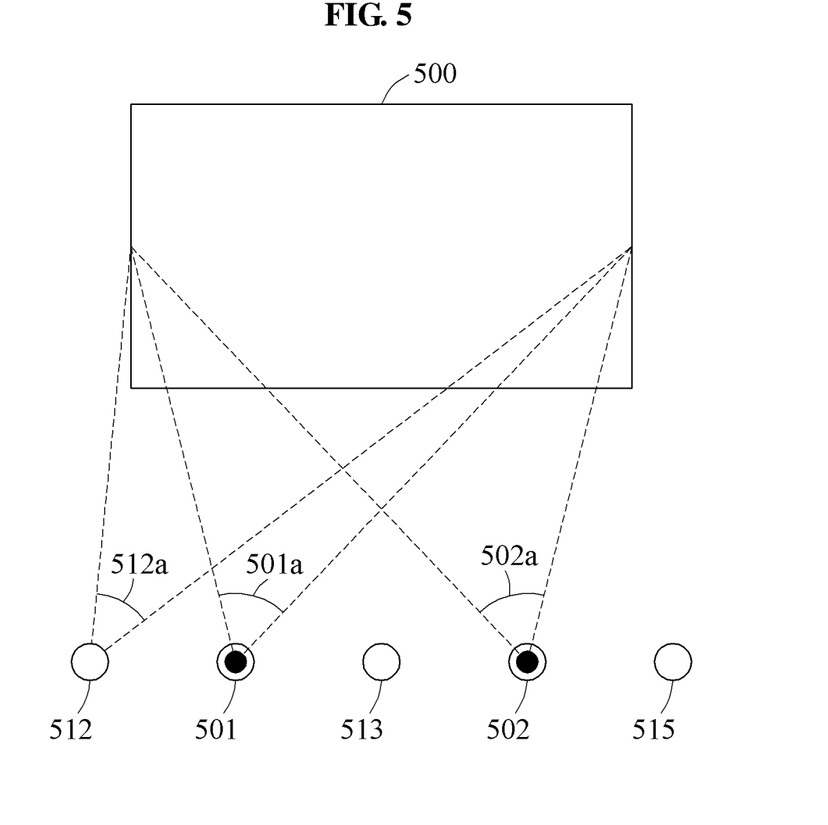
FIG. 5 illustrates virtual viewpoints according to at least one example embodiment.

FIG. 5 illustrates virtual viewpoints according to at least one example embodiment.

Input images may be images acquired by photographing the same scene 500 at the same time from different viewpoints 501 and 502. Virtual view images may correspond to images acquired from viewpoints 512, 513, and 512 different from the viewpoints 501 and 502 of the input images. In detail, the virtual view images may not be images directly acquired from the viewpoints 512, 513, and 514, but images generated by post-processing the input images.

In a case in which the apparatus 200 of FIG. 2 for transmitting image data provides (e.g., generates) a 3D image of a multiview image, positions and a number ("quantity") of the viewpoints 512, 513, and 514 of the virtual view images may be determined based on viewpoints that may be displayed to a user through a display (e.g., display 110a) using a panel image. For example, a displayed panel image may include an image of a field of view 501a associated with viewpoint 501, an image of a field of view 502a associated with viewpoint 502, some combination thereof, or the like. The display may simultaneously provide images corresponding to multiple (e.g., five) viewpoints. In a case in which the input images are images corresponding to the two viewpoints 501 and 502 (e.g., images of fields of view 501a and/or 502a), the number of the viewpoints 512, 513, and 514 of the virtual view images may correspond to "3". The positions of the viewpoints 512, 513, and 514 of the virtual view images may be determined based on an image expression pattern of the display. For example, the processor 220 may determine the position of the viewpoints 512, 513, and 514 (e.g., relative positions of same relative to viewpoints 501, 502) of the virtual view images based on characteristics of a lenticular lens.

A virtual view image may be generated based on a determined position of a virtual viewpoint. For example, as shown in FIG. 5, if and/or when a position of a virtual viewpoint 512 is determined, a field of view 512a associated with the virtual viewpoint 512 may be determined. A virtual view image may be generated according to the field of view 512a, such that the virtual view image associated with the virtual viewpoint 512 is an image of the field of view 512a.

In a case in which the apparatus 200 for transmitting image data provides a 3D image of a light field image, the positions and the number of the viewpoints 512, 513, and 514 of the virtual view images may be determined based on a 3D image output range of the display. The 3D image output range may be a range within which the display provides a 3D image to a user.

Figure 6:
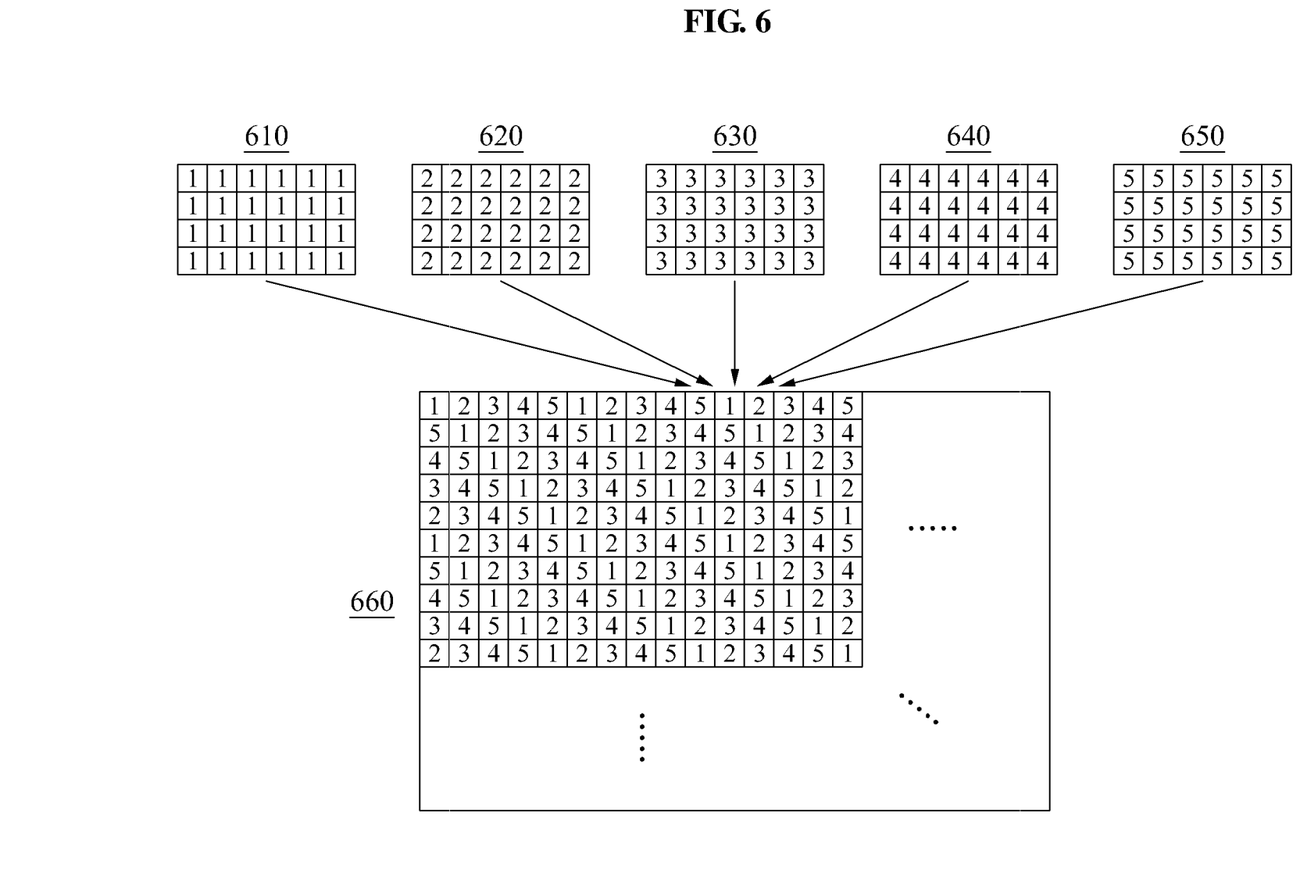
FIG. 6 illustrates a method of weaving a panel image according to at least one example embodiment.

FIG. 6 illustrates a method of weaving a panel image according to at least one example embodiment.

A panel image 660 may be generated by weaving one or more input images and virtual view images 610 through 650. For example, the images 620 and 640 may be the input images corresponding to the viewpoints 501 and 502 of FIG. 5, and the images 610, 630, and 650 may be the virtual view images corresponding to the viewpoints 512, 513, and 514 of FIG. 5. Numbers marked in the images indicate pixel values of corresponding pixels.

As shown in FIG. 6, weaving input images and virtual view images 610 through 650 may include generating a panel image 660 that includes a distribution of the pixels of the images 610 through 650. The distribution of pixels may include a distribution of the pixels of images 610 to 650 according to one or more distribution patterns. The distribution patterns may be associated with an image expression pattern of a display and/or display interface. As shown in FIG. 6, for example, the distribution pattern according to which the pixels of images 610 to 650 are included in the panel image include a repetitive sequential ascending pattern from left to right for each row of pixels of the panel image 660, where the origin pixel at the left of each row changes according to a descending order with successive rows in a top-to-bottom pattern, such that the origin pixel (e.g, the leftmost pixel at the top pixel row of the panel image 660) is the top-left pixel of image 610.

Pixels of the input images and the virtual view images 610 through 650 may be weaved based on an image expression pattern of a display. A weaving pattern of the panel image 660 is an example, and example embodiments are not limited thereto. For example, a panel image for providing a multiview image may be generated. In another example, a panel image for providing a light field image may be generated.

The generated panel image 660 may be output through a display (e.g., at least one of displays 110a, 120a, 130a).

Figure 7:
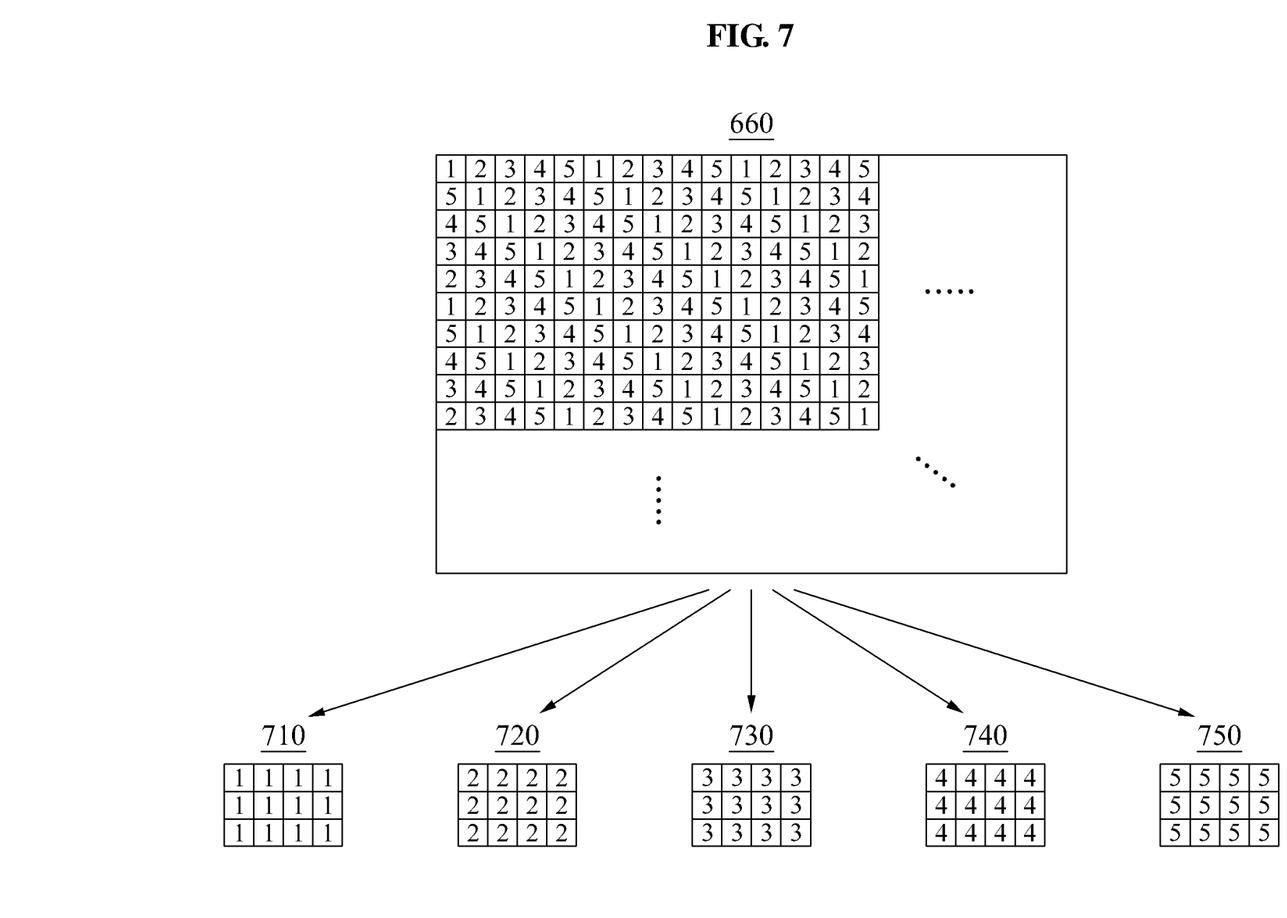
FIG. 7 illustrates a method of generating view images based on a panel image according to at least one example embodiment.

FIG. 7 illustrates a method of generating view images based on a panel image according to at least one example embodiment.

One or more portions of the apparatus 200 of FIG. 2, including the processor 220, may generate view images based on the panel image 660 of FIG. 6. For example, a number of the generated view images may be equal to a number of the images 610 through 650 used to generate the panel image 660. Viewpoints of view images 710 through 750 may correspond to the viewpoints of the images 610 through 650, respectively.

The images 710 through 750 may be the same as the images 610 through 650.

Resolutions of the images 710 through 750 may be lower than resolutions of the images 610 through 650. The panel image 660 may be generated by sampling the images 610 through 650. Thus, a resolution of the panel image 660 may be lower than the resolutions of the images 610 through 650, and the resolutions of the images 710 through 750 generated based on the panel image 660 may also be lower than the resolutions of the images 610 through 650.

Figure 8:
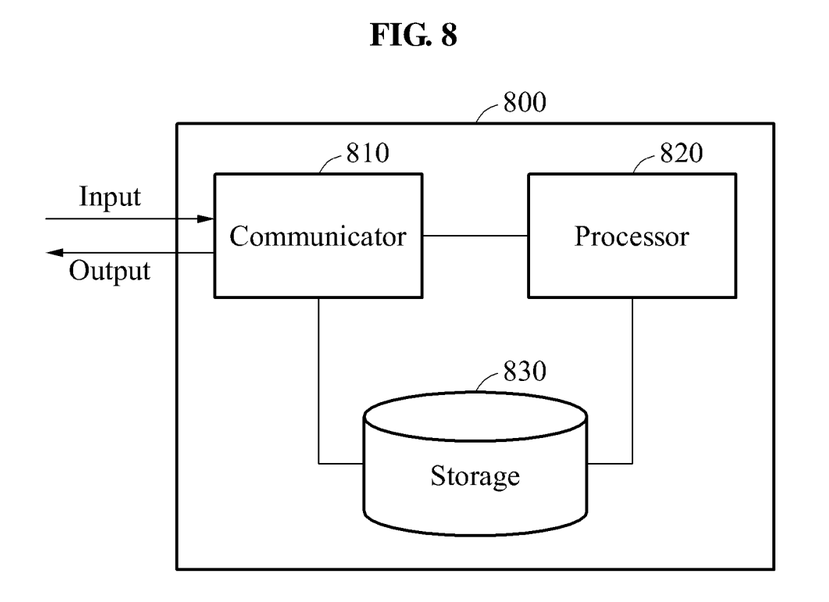
FIG. 8 illustrates an apparatus for generating an image according to at least one example embodiment.

FIG. 8 illustrates an apparatus for generating an image according to at least one example embodiment. In some example embodiments, the apparatus 800 may be included in one or more of the devices 120, 130 of FIG. 1. An apparatus 800 included in one or more of the devices 120, 130 may be an apparatus 800 for generating an image.

The sub-device 120 of FIG. 1 may include an apparatus 800 for generating an image. The apparatus 800 for generating an image may receive image data to be used to provide a 3D image from the main device of FIG. 1.

The apparatus 800 for generating an image includes a communicator 810, a processor 820, and a storage 830. The storage 830 may be referred to herein interchangeably as a memory 830. A communicator may be referred to herein interchangeably as a communication interface.

The communicator 810 may be connected to an external device, and transmit and receive data to and from the external device. For example, the communicator 810 may receive the image data from the main device 110.

The processor 820 may process the data received by the communicator 810, and data stored in the storage 830. The processor may be a central processing unit (CPU), a controller, or an application-specific integrated circuit (ASIC), that when, executing instructions stored in the memory 230, configures the processor as a special purpose computer to perform one or more of the operations described herein.

The storage 830 ("memory 830") may store the data received by the communicator 810, and the data processed by the processor 820. The memory 830 may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM). The memory 830 may store computer-readable instructions. The memory 830 may include a non-transitory computer-readable storage medium. The processor 820 may execute one or more computer-readable instructions stored in the memory 830 to perform one or more operations.

The communicator 810, the processor 820, and the storage 830 will be described in detail with reference to FIGS. 9 and 10.

Figure 9:
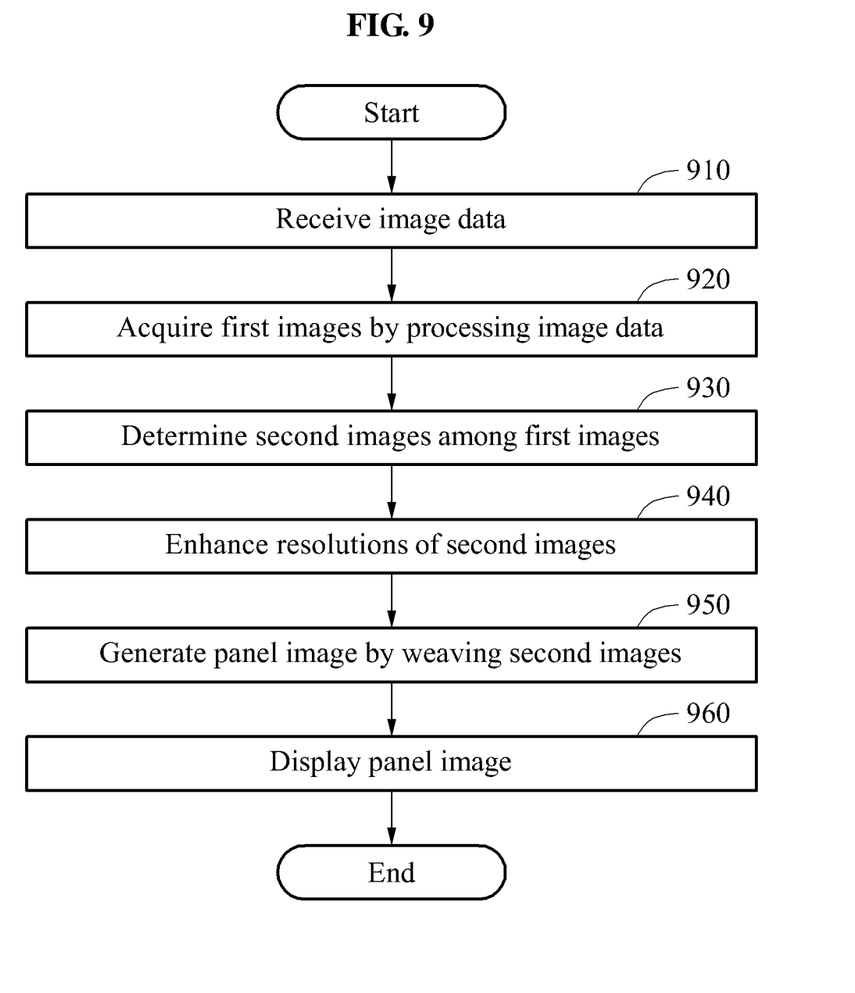
FIG. 9 illustrates a method of generating an image according to at least one example embodiment.

FIG. 9 illustrates a method of generating an image according to at least one example embodiment. One or more portions of an apparatus 800, including one or more of the processor 820 and the communicator 810, may implement one or more of operations 910 to 960 illustrated in FIG. 9. A processor 820 may perform one or more operations described herein based on executing one or more computer-readable instructions stored on the memory 830.

In operation 910, the apparatus 800 of FIG. 8 may receive image data from an external device. The external device may be the main device 110 of FIG. 1 or the apparatus 200 of FIG. 2 for transmitting image data. For example, the image data may be compressed data.

Operations 920 through 960 may be performed by the processor 820 of FIG. 8.

In operation 920, the apparatus 800 may acquire first images by processing the image data. For example, the first images may be acquired by decoding the image data. The first images may correspond to the view images 710 through 750 described with reference to FIG. 7.

In operation 930, the apparatus 800 may determine one or more second images among the first images based on viewpoints providable to a user through a display of the sub-device 120. For example, in a case in which the display is capable of providing all the viewpoints of the first images, all of the first images may be determined to be the second images. In another example, in a case in which the display is capable of providing a portion of the viewpoints of the first images, a portion of the first images may be determined to be the second images. In still another example, the second images may be determined based on a range of depth expressible through the display.

In operation 940, the apparatus 800 may enhance resolutions of the second images.

The resolutions of the second images may be enhanced based on the first images. In a case of up-scaling a second image, a plurality of pixels generated based on a single pixel value may have the same pixel values. Values of a portion of adjacent pixels having the same pixel values in the second image may be adjusted based on the first images. A first image corresponding to a viewpoint differing from a viewpoint of a second image may include a pixel representing a gap between adjacent pixels in a second image which is not up-scaled yet. Values of the pixels of the up-scaled second image may be adjusted based on a value of the pixel of the first image.

In operation 950, the apparatus 800 may generate a panel image by weaving the second images. For example, the panel image may be generated by weaving the second images based on an image expression pattern of the display. Descriptions of operation 320 of FIG. 3 may be applied to a method of generating a panel image.

In operation 960, the apparatus 800 may display the panel image.

Figure 10:
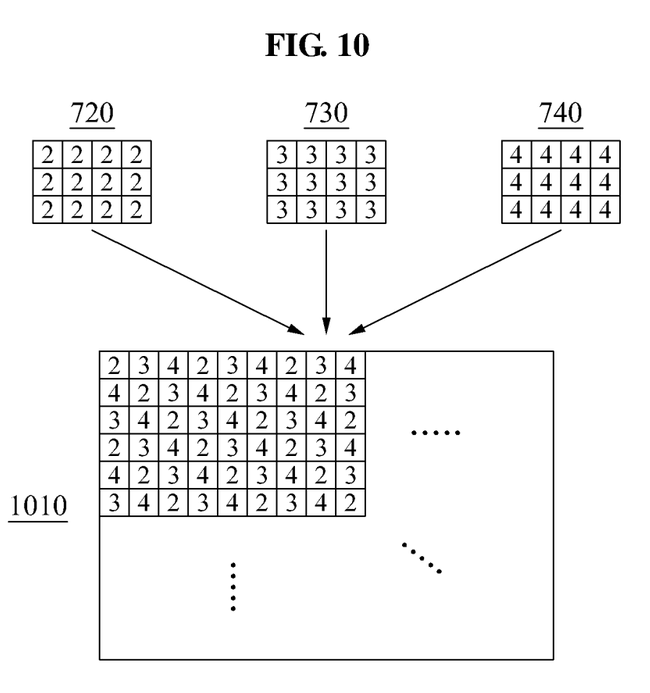
FIG. 10 illustrates a panel image according to at least one example embodiment.

FIG. 10 illustrates a panel image according to at least one example embodiment.

A portion of the first images 710 through 750 may be determined to be the second images 720, 730, and 740. For example, to provide a multiview image, the second images 720, 730, and 740 may be determined based on viewpoints providable to a user through a display. A viewpoint that is "providable" to a user through a display may refer to a viewpoint that is associated with a display configuration of the display. For example, the display may be configured to display an image corresponding to a field of view associated with the viewpoint, thereby rendering the viewpoint "providable" to a user through the display. Thus, determining ("selecting") a second image (e.g., image 720) from the first images 710 through 750 may include determining that the second image corresponds to a field of view of a viewpoint that a display is configured to provide to a user. For example, a display may be configured to display a panel image of a scene and convert the displayed panel image into one or more light fields corresponding to one or more images associated with the one or more "providable" viewpoints. In another example, to provide a light field image, the second images 720, 730, and 740 may be determined based on a 3D image output range.

A panel image 1010 may be generated by weaving the second images 720, 730, and 740 based on the image expression pattern of the display. A weaving pattern of the panel image 1010 may be an example, and example embodiments are not limited thereto. The panel image 1010 may be output through the display.

The apparatus 800 of FIG. 8 for generating an image may receive image data from the main device 110 of FIG. 1. The image data may be associated with first images. In this example, the apparatus 800 for generating an image may not perform a process of generating virtual images with respect to virtual viewpoints, and thus a computational complexity of the apparatus 800 for generating an image may decrease, whereby the sub-device 120 of FIG. 1 may provide a 3D image to the user in real time.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method of transmitting image data, the method comprising:
    sampling a panel image to separate the panel image into one or more view images, the panel image generated based on weaving a plurality of images together according to a distribution pattern, such that the panel image includes a distribution of pixels of the plurality of images according to the distribution pattern;
    converting a target image of the one or more view images into image data by processing the view images, wherein the target image is determined from the one or more view images based on viewpoints providable to a user through a display of a target device; and
    transmitting the image data to the target device,
    wherein the target image being displayed based on the image data by the target device.

2. The method of claim 1, wherein,
    the method includes generating one or more virtual view images based on one or more input images; and
    the method further includes generating the panel image by weaving the one or more input images and the one or more virtual view images.

3. The method of claim 2, wherein the generating of the one or more virtual view images includes,
  calibrating the one or more input images;
  determining one or more depth values of the input images based on the calibrated one or more input images; and
  generating the one or more virtual view images based on the one or more depth values.

4. The method of claim 3, wherein,
  the one or more input images includes a plurality of input images; and
  the calibrating includes calibrating at least one of
    a geometric structure in the input images, and
    a photometric difference between the input images.

5. The method of claim 2, wherein the generating of the panel image includes generating the panel image by separately sampling the one or more input images and the one or more virtual view images.

6. The method of claim 2, wherein the generating of the panel image includes generating the panel image by separately sampling the one or more input images and the one or more virtual view images based on the distribution pattern.

7. The method of claim 1, wherein the converting includes generating the image data by compressing the one or more view images.

8. An apparatus for transmitting image data, the apparatus comprising:
  a memory having computer-readable instructions stored therein;
  a processor configured to execute the computer-readable instructions to,
    sample a panel image to separate the panel image into one or more view images, the panel image generated based on weaving a plurality of images together according to a distribution pattern, such that the panel image includes a distribution of pixels of the plurality of images according to the distribution pattern, and
    convert a target image of the one or more view images into image data by processing the view images, wherein the target image is determined from the one or more view images based on viewpoints providable to a user through a display of a target device; and
  a communicator configured to transmit the image data to the target device,
  wherein the target image being displayed based on the image data by the target device.

9. The apparatus of claim 8, wherein the processor is configured to execute the computer-readable instructions to,
  generate one or more virtual view images based on one or more input images, and
  generate the panel image based on weaving the one or more input images and the one or more virtual view images.

10. A method of transmitting image data, the method comprising:
  generating one or more view images based on separately sampling one or more input images;
  converting the one or more view images into image data by processing the view images; and
  transmitting the image data to a target device,
  wherein the generating one or more view images includes generating one or more virtual view images based on the one or more input images and generating the one or more view images based on the one or more input images and the one or more virtual view images,
  wherein the generating of the one or more virtual view images includes
    calibrating the one or more input images,
    determining one or more depth values of the input images based on the calibrated one or more input images, and
    generating the one or more virtual view images based on the one or more depth values.

* * * * *